United States Patent Office 3,008,902
Patented Nov. 14, 1961

3,008,902
OZONE SOLUTIONS
Gerhard A. Cook, Clarence, N.Y., assignor to Union Carbide Corporation, a corporation of New York
No Drawing. Filed Nov. 19, 1956, Ser. No. 622,749
7 Claims. (Cl. 252—186)

This invention relates to liquid ozone solutions, and more particularly concerns homogeneous ozone solutions which are convenient and safe to handle.

Liquid oxygen has long been used as a diluent for ozone because of its high solvent power for ozone, and the fact that ozone and oxygen are miscible and compatible within certain proportions. As is known, a solution of ozone in liquid oxygen is capable of existing in either of two forms at $-183°$ C. Below concentrations of about 24 weight percent (17.6 mole percent) ozone in liquid oxygen, the solution ingredients are compatibly miscible in all proportions, and form a relatively light phase homogeneous solution. This light ozone containing phase is resistant to explosion. At concentrations in excess of about 24 weight percent, the excess ozone forms a dense ozone-rich second phase with oxygen, which is immiscible with the relatively lighter ozone containing phase. The ozone-rich second phase is highly unstable, and produces a violent explosion when artificially stimulated by an electric spark or other means. Up to now, it has been impossible at $-183°$ C. to formulate homogeneous concentrated solutions of ozone in oxygen, substantially above 24%, without encountering the formation of this highly dangerous, heavy layer of ozone-enriched second phase.

It is, therefore, an object of the present invention to provide an ozone solution having greater stability at higher concentrations than present day ozone solutions.

Another object of the present invention is to provide in a solution wherein ozone and oxygen are major constituents, means for improving the stability of high ozone concentrations, particularly above approximately 24% by weight.

Yet another object of the present invention is to provide a novel method of producing a fairly concentrated solution of ozone and oxygen, and promoting the stability of such ozone concentrations.

Other objects, features and advantages will be apparent from the following detailed description.

In the description that follows, unless otherwise specified, the term "percentage" is intended to refer to weight percentages.

The present invention comprises the discovery that certain additions to ozone-oxygen solutions effect a marked improvement in the stability of the solution, and enable the ozone concentration to be increased substantially above 24% to as much as about 40%, without the formation of an unsafe ozone-enriched second phase.

I have found that the addition of either argon alone or argon and a fluorinated hydrocarbon consisting of one or more liquefied perhalogenated, fluorine-containing methanes to a solution of ozone in oxygen beneficially improves the solubility capacity of the oxygen for ozone without creating a hazardous, explosive condition. The argon addition acts as a blending agent or stability promoter, and prevents the formation of a heavy ozone phase at ozone concentrations substantially beyond 24%.

Among the component blending agents that may be employed in combination with argon are liquefied perhalogenated methanes in which the halogen substituent is either fluorine or fluorine and chlorine, there being preferably at least two fluorine atoms per molecule. Stated in other terms, the ozone blending agent may consist partly of argon and partly of fully substituted methane whose structures can be graphically represented by the formula: $C(Cl)_a(F)_b$ where $a$ is an integer having a value of from 0 to 2, and $b$ is an integer having a value of from 2 to 4, with the sum of $a$ and $b$ being 4. A number of other component blending agents comprising liquid halogen-substituted hydrocarbons are satisfactory in most respects, but these suffer from the disadvantage that ozone tends to react with the C—H bonds and the C—C bonds.

According to the invention, the blending agent is added to an otherwise two-component solution of ozone in oxygen in such amounts that the ozone and oxygen components constitute the major constituents of the solution, and the blending agent is present only in minor amounts. In order to secure substantial benefits, the blending addition of the invention should range in amounts from as low as about 1% to as high as about 15%. This composition range of blending material is most effective in blending liquid ozone concentrations into compatible, misicible, and homogeneous solutions, particularly for ozone concentrations in liquid oxygen between about 24% and about 40%, without creating any hazardous explosive conditions.

In the practice of the present invention it is desirable that the liquid solution of ozone, oxygen, and blending agent be maintained close to the melting point of the mixture to minimize loss of ozone from the solution by evaporation, and to minimize the rate of spontaneous ozone decomposition. For purposes of this invention in the preparation, handling, transportation and storage of ozone solutions, a temperature between about $-184°$ C. and $-140°$ C. has been found most desirable, although higher or lower temperatures may be employed if so desired.

The formation of the ozone-oxygen solutions of this invention may be accomplished in any of several ways. One method involves passing a gaseous mixture of oxygen and ozone, for example, the effluent from an ozonizer of the silent electrical discharge type, which normally would contain from 2 to 4 percent ozone, the balance being oxygen when pure oxygen has been used as the ozonizer charge gas, through liquid oxygen at its normal boiling point at atmospheric pressure. The ozone gas is dissolved in the liquid oxygen essentially completely and the ozone content of the liquid phase can be easily calculated from observed rates of flow of the gases entering the liquid container, weight change of the liquid and concentration of the ozone in the gas from the ozonizer. Another means of determining the ozone content of the liquid is by density of the liquid.

At $-183°$ C. one can safely dissolve up to about 24 weight percent ozone in the liquid oxygen. A suitable amount of argon-containing blending agent, between about 1% and about 15% of the ozone solution is then placed in a separate container, and introduced in vapor form into the ozone-oxygen solution where it condenses and dissolves. Thereafter, the ozone concentration in the ozone-oxygen solution may be increased substantially above about 24% by allowing the escape of the vapor phase, which is essentially all oxygen. The temperature at which concentration of the ozone solution is conducted may be at or above $-183°$ C., a temperature of about $-180°$ C. being preferred.

An alternate method of preparing an argon-containing solution of ozone and oxygen may comprise an ozone-transfer process, which consists in passing the above ozonizer effluent, consisting of a mixture of ozone and oxygen, through a bed of adsorbent material such as silica gel, where the ozone is selectively adsorbed. The adsorbed ozone may then be removed or desorbed from the adsorbent, using as a stripping a suitable mixture of argon and oxygen, thereby producing an effluent containing the three components, argon, ozone, and oxygen.

Thereafter, the three component mixture may be condensed and liquefied, using for example a refrigerant such as liquid oxygen.

Making the blended ozone solution of the invention is a convenient means of producing solutions containing more than about 24% ozone, without forming a second ozone-rich phase, and also helps to overcome a formidable safety handicap in the handling, storage, transportation and chemical reaction of ozone. The invention is useful as a source of ozone for carrying out chemical reactions, as by introducing the blended ozone solution into a reaction zone.

In order to indicate still more fully the nature of the present invention, the following typical examples are set forth, it being understood that these examples are presented as illustrative only, and are not intended to limit the scope of the invention.

*Example I*

A solution was prepared containing 34.6 weight percent (26.9 mole percent) ozone, 5.0 weight percent argon, and the remainder oxygen. This solution did not explode when a high-voltage spark was passed through the liquid at $-183°$ C.

*Example II*

A solution was prepared containing 37.7 weight percent (30.1 mole percent) ozone, 10.4 weight percent argon, and the remainder oxygen. When artificially stimulated by an electric spark at $-183°$ C., the solution did not explode.

*Example III*

A solution was prepared containing 41.3 weight percent (33.1 mole percent) ozone, 4.6 weight percent argon, and the remainder oxygen. This solution produced an explosion under the stimulus of a high voltage spark at $-183°$ C.

*Example IV*

In a similar manner to Example III, a solution containing 42.1 weight percent ozone, 10.4 weight percent argon, and the remainder oxygen was tested. The solution exploded on sparking.

From the above examples it will be seen that ozone may be incorporated in an oxygen solvent with the aid of a blending agent, and still form a miscible, homogeneous solution which is convenient for handling ozone in fairly concentrated form, particularly at concentrations between about 24% and 40% ozone. The blending agent may comprise argon or an argon-containing solution having a liquefied perhalogenated, fluorine-containing methane, the halogen substituent being either fluorine or chlorine, there being at least two fluorine atoms per molecule of blending material. An obvious advantage of the blended ozone solution of the invention is the factor of safety, the safe concentration of ozone having been substantially raised, and the explosive range having been considerably limited.

It will be understood that modifications and variations may be effected without departing from the spirit and scope of the novel concepts of the present invention.

What is claimed is:

1. A stable homogeneous liquid solution consisting of liquid oxygen as the solvent; liquid ozone as the solute; and a blending agent consisting of argon and a liquefied fluorine containing perhalogenated methane the halogen being selected from the group consisting of fluorine and chlorine there being at least two fluorine atoms in each molecule of blending agent; said liquid ozone being present in amounts from above about 24 percent to about 40 percent by weight, and said liquid blending agent being present from about 1 percent to about 15 percent; the remainder being liquid oxygen.

2. A stable homogeneous single phase liquid solution consisting of liquid oxygen as the solvent; liquid ozone as the solute; and argon as the blending agent, said liquid ozone being present in amounts from above about 24 percent to about 40 percent by weight and said argon being present in amounts from about 1 percent to about 15 percent, the remainder being liquid oxygen.

3. A stable homogeneous liquid solution consisting of liquid oxygen as the solvent; liquid ozone as the solute; and a blending agent consisting of argon and dichlorodifluoromethane, said liquid ozone being present in amounts from above about 24 percent to about 40 percent by weight and said blending agent being present from about 1 to about 15 percent the remainder being liquid oxygen.

4. A stable homogeneous liquid solution consisting of liquid oxygen as the solvent; liquid ozone as the solute; and a blending agent consisting of argon and trifluorochloromethane, said liquid ozone being present in amounts from above about 24 percent to about 40 percent by weight and said blending agent being present from about 1 percent to about 15 percent the remainder being liquid oxygen.

5. A stable homogeneous liquid solution consisting of liquid oxygen as the solvent; liquid ozone as the solute; and a blending agent consisting of argon and carbontetrafluoride, said liquid ozone being present in amounts from above about 24 percent to about 40 percent by weight and said blending agent being present from about 1 percent to about 15 percent the remainder being liquid oxygen.

6. A method of preventing the promotion of a dangerous high-density, ozone-rich liquid phase in the handling, storing and shipping of liquid solutions consisting of liquid ozone as the solute in liquid oxygen as the solvent comprising adding to said liquid solution between about 1 percent and 15 percent of argon.

7. A stable homogeneous single phase liquid solution consisting of liquid oxygen as the solvent; liquid ozone present in amounts from about 24 percent to about 40 percent as the solute; and a blending agent present in amounts from 1 percent to 15 percent consisting of argon and at least one liquefied, perhalogenated fluorine-containing methane, the halogen being selected from the group consisting of fluorine and chlorine there being at least two fluorine atoms in each molecule of blending agent, such liquid solution being maintained at a temperature from between about $-184°$ C. and about $-140°$ C.

References Cited in the file of this patent

UNITED STATES PATENTS

| | | |
|---|---|---|
| 2,700,648 | Thorpe et al. | Jan. 25, 1955 |
| 2,874,164 | Hann | Feb. 17, 1959 |
| 2,876,077 | Haller | Mar. 3, 1959 |

FOREIGN PATENTS

| | | |
|---|---|---|
| 729,010 | Great Britain | Apr. 27, 1955 |

OTHER REFERENCES

Hann: "Chemical Engineering Progress," vol. 51, No. 11, pages 523–527, November 1955. (Copy in Sci. Lib.)

Comprehensive Treatise on Inorganic and Theoretical Chemistry, by Mellor, vol. I, p. 894, pub. by Longmans, Green & Co., New York (1922). (Copy in Sci. Lib.)